(12) United States Patent
Sureshchandra et al.

(10) Patent No.: US 11,341,565 B2
(45) Date of Patent: May 24, 2022

(54) SEARCH SYSTEM THAT PROVIDES PERSONALIZED RESULTS

(71) Applicant: Microsoft Technology Licensing, LLC, Redmond, WA (US)

(72) Inventors: Bhimani Kalpesh Sureshchandra, Bothell, WA (US); Ashwin Mallur Parthasarathy, Bellevue, WA (US); Yumao Lu, Bellevue, WA (US); Priyanka Krishnamurthi, Seattle, WA (US); Yongjian Deng, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/684,740

(22) Filed: Nov. 15, 2019

(65) Prior Publication Data

US 2021/0150615 A1 May 20, 2021

(51) Int. Cl.
*G06Q 30/06* (2012.01)
*G06N 20/00* (2019.01)

(52) U.S. Cl.
CPC ......... *G06Q 30/0641* (2013.01); *G06N 20/00* (2019.01); *G06Q 30/0633* (2013.01)

(58) Field of Classification Search
CPC .............................................. G06Q 30/06–08
See application file for complete search history.

(56) References Cited

U.S. PATENT DOCUMENTS

| 2005/0004889 | A1* | 1/2005 | Bailey ................. G06Q 30/02 |
| 2014/0095495 | A1* | 4/2014 | Brukman ............. G06F 16/248 |
| | | | 707/732 |

* cited by examiner

*Primary Examiner* — Ming Shui
(74) *Attorney, Agent, or Firm* — Calfee, Halter & Griswold LLP

(57) ABSTRACT

A search system that is configured to generate personalized ranked lists of search results for end users is disclosed. The search system provides backend search services to several websites of different organizations, where the websites are configured to offer goods for acquisition to the end users. The search system is configured to construct profiles for users that interact with webpages of the websites, and is further configured to construct personalized re-rankers based upon such profiles.

20 Claims, 9 Drawing Sheets

SEARCH SYSTEM THAT PROVIDES PERSONALIZED RESULTS

BACKGROUND

A conventional computer-implemented search engine is configured to return ranked lists of search results to client computing devices responsive to receiving queries from the client computing devices. To provide relevant search results, the computer-implemented search engine infers the information retrieval intent of the users who submitted the queries. Inferring information retrieval intent of end users has proven to be a difficult task, at least partially because end users often submit ambiguous queries to computer-implemented search engines. For instance, a user may be interested in acquiring information about televisions and may set forth the query "television" to a computer-implemented search engine. The query "television", however, does not specify a size of the television that is of interest to the user, does not specify technical features of the television that are of interest to the user (e.g., LED vs, OLED vs, LCD, etc), and so forth. Further, the query "television", without additional context, is ambiguous as to whether the user is interested in acquiring information about television sets or television shows. Popular computer-implemented search engines have been developed over the course of several years to infer the information retrieval intent of users who issue queries to the search engines by taking into account historical queries of users, features of the queries, features of potential search results, amongst other information.

Conventional computer-implemented search engines are the result of a massive amount of research and the allocation of a tremendous amount of resources over the course of decades by a relatively small number of relatively large companies. Conventionally, organizations other than those who have spent years developing search engines that wish to offer search services to end users (over indices maintained by the organizations) are not able to offer robust computer-implemented search engines, as many of these organizations do not have the resources to develop and maintain a search engine. For instance, a company that specializes in sale of electronic equipment to consumers may not have resources to develop and maintain a computer-implemented search engine that is well-suited for inferring intent of users who are searching for certain types of electronic equipment by way of a website of the company. Conventionally, the company is left with two choices: 1) allocate resources to develop a customized search engine, wherein end users may nevertheless have a sub-optimal experience when attempting to search using such search engine (due to lack of expertise in search engine technologies; or 2) employ a general-purpose search engine offered by a third-party, where the general-purpose search engine is not customized for the business of the company and therefore may provide sub optimal search results to customers of the company who set forth queries to the search engine.

In either of these approaches, the search engine employed by the company is somewhat inflexible in that the search engine is unable to be customized for end users. In an example, consumers from a particular geographic region (e.g., a state) may prefer a first brand of electronic equipment over a second brand of electronic equipment. Therefore, ideally, when an end user from the geographic region, submits the query "television" to a search engine by way of a website of the company noted above, a television of the first brand will be presented above a television of the second brand in a ranked list of search results returned by the search engine. Currently, however, there is no suitable mechanism that is available to provide personalized search results to users who are potential purchasers of goods by way of websites of companies that are offering such goods for acquisition.

SUMMARY

The following is a brief summary of subject matter that is described in greater detail herein. This summary is not intended to be limiting as to the scope of the claims.

Described herein are various technologies pertaining to personalizing search results for a user when the user submits a query to a website that is configured to facilitate sale of goods. With more particularity, a computing system may host a website, wherein the website is for an organization (such as a retailer), and further wherein the organization offers goods for acquisition to end users by way of the website. For example, the goods may be items such as toys, electronics, etc. In another example, the goods may be intangible items such as digital movies, digital television programs, digital video games, etc. In yet another example, the goods may be rooms that are available to rent (e.g., hotel rooms), healthcare plans, and so forth.

A search computing system is configured to provide backend search services for the computing system that hosts the website. Thus, when a client computing device transmits a query to the computing system, the computing system (upon receipt of the query) transmits the query to the search computing system, and the search computing system executes a search over an index of goods that is assigned to the website. For example, when the website is configured to facilitate sale of electronics items to end users, the index of goods assigned to the website can include identities of electronic goods that are available for acquisition by way of the website and features of such electronic goods. The search system executes the search over the index of goods based upon the query and returns a ranked list of goods to the computing system from which the query was received. The computing system, upon receipt of the ranked list of goods, in turn transmits the ranked list of goods to the client computing device that originally submitted the query, whereupon the ranked list of goods is presented to an end user of the client computing device.

As noted above, the search computing system can customize ranking of goods for the user of the client computing device. Hence, an order of goods in the ranked list of goods can be based upon an identity of the user of the client computing device and/or an attribute of the user of the client computing device. Thus, the search computing system may return a first ranked list of goods based upon a query submitted by a first user having a first attribute while the search computing system may return a second ranked list of goods based upon the same query submitted by a second user having a second attribute (wherein the attribute may be age, location, gender, etc.).

To allow for customized ranking of search results for a user with respect to a website, the search computing system can construct a profile for the user for the website. The search computing system can construct the profile based upon data received from several sources. For example, the website may have information about the user in a website profile of the user maintained by the website, wherein the website profile may include, for example, identities of goods acquired by the user by way of the website over time. In another example, the search system may already have information about the user (optionally including information about items purchased by way of other websites that employ the search computing system to provide search results). When such information (the website profile and/or the information already in possession of the search computing system) is available to the search computing system, the search computing system can construct an initial profile for the user based upon the aforementioned information.

In addition, the search computing system can construct and/or update the user profile based upon event data packets received for the user, wherein each event data packet represents an interaction of the user with a webpage of the website hosted by the computing system (and/or webpages of other websites that use the search computing system to provide backend search services). For instance, webpages of the website may have tags included therein, such that when a web browser of the client computing device loads the webpage, the client computing device is caused to generate an event data packet and transmit the event data packet to the search computing system. Exemplary information that can be included in the event data packet comprises, but is not limited to, a timestamp, an identifier for the website, an identifier of an index of goods for the website, a name for an event (e.g., "click", "add to cart", "query", "purchase", etc.), text of a submitted query, an identity of a session, a user identifier, a location of the client computing device, search results displayed, an identity of a webpage, a number of search results identified, and so forth. The search computing system, in an example, receives event data packets for the user over time and constructs and/or updates the user profile based upon the received event data packets.

The search computing system, then, can construct user profiles for end users who interact with webpages of the website, such that several user profiles are constructed. In an exemplary embodiment, the search computing system assigns each user profile to one or more cohorts of user profiles, wherein user profiles assigned to a cohort are identified as sharing a common attribute. For example, a cohort may include user profiles of users that are from a same location (e.g., city or state). In another example, a cohort may include user profiles of users that are within a same age range. In yet another example, a cohort may include user profiles of users who share multiple attributes (e.g., age range and location). Thus, the computing system can construct a user profile for a user and can assign the user profile for the user to one or more cohorts of user profiles.

An index of goods (which represents goods available for acquisition by way of the website) can be updated based upon the cohorts of user profiles. For example, the search computing system can assign a cohort to a good represented in the index of goods, wherein the cohort can be identified as a feature of the good. Thus, for instance, a good that is typically purchased by users between the ages of 25-35 can be assigned a cohort corresponding to such age range in index of goods. Hence, in the index of goods for the website, a good represented in such index can have one or more user cohorts assigned thereto as a feature of the good.

In addition, the search computing system can learn a long-term re-ranker for the user (with respect to the website) based upon the user profile for the website. Since the user profile includes information that is indicative of features of goods that have been historically of interest to the user, the learned long-term re-ranker can be configured to "boost" goods that have such features in search results. Moreover, the search computing system can optionally construct a short-term re-ranker for the user, wherein such short-term re-ranker is constructed based upon relatively recently received event data packets (e.g., event data packets received within a user session with the website). For instance, during a session with the website, the user may select goods of a specific brand. The search computing system can construct a short-term re-ranker that effectively boosts goods of the brand based upon these previous selections.

In operation, when the computing system receives a query from the client computing device operated by the user, the computing system can transmit such query to the search computing system along with, for example, an identifier for the user and an identifier for the website. The search computing system performs the following actions upon receiving the query, the identifier for the website, and the identifier for the user: 1) identifies an index of goods that is assigned to the website; 2) identifies a user cohort to which the user is assigned based upon the user identifier; 3) identifies a long-term re-ranker for the user based upon the user identifier; and 4) optionally identifies a short-term re-ranker based upon the user identifier. The search computing system then generates a personalized ranked list of goods (from the index of goods) based upon the query.

The search computing system can perform several actions in connection with generating the personalized ranked list of goods. The search computing system identifies a set of goods (e.g., search results) based upon a search over the index of goods based upon the query. The search computing system can then provide the features of goods in the set of goods (including user cohorts assigned to the goods) and features of the query (including terms in the query and an identifier for the user cohort to which the user is assigned) to the general-purpose ranker, which orders the set of goods in a first order to generate a first ranked list of goods, wherein the first ranked list of goods is based upon the query features of the query and the features of the goods in the set of goods. Therefore, the general-purpose ranker provides an initial ranking of goods, wherein the general-purpose ranker may be employed to rank search results for several different websites.

The search computing system can then employ the identified long-term re-ranker to re-rank the first ranked list of goods output by the general-purpose ranker to construct a second ranked list of goods. The long-term re-ranker can generate the second ranked list of goods based upon the first order of goods in the first ranked list of goods, the features of the query, and the features of the goods in the set of goods. The search computing system can optionally provide the second ranked list of goods to the identified short-term re-ranker, wherein the short-term re-ranker can re-rank the second ranked list of goods to generate a third ranked list of goods. The short-term re-ranker can re-rank the second ranked list of goods based upon an order of the goods in the second ranked list of search results, the features of the query, and the features of the goods represented in the index. The search computing system can subsequently transmit ranked goods (e.g., the second ranked list of goods or the third ranked list of goods) to the computing system, which in turn transmits the ranked goods to the client computing device, wherein the client computing device presents the ranked goods on a display to the user who submitted the query.

As can be ascertained from the above, the technologies described herein exhibit various improvements over conventional technologies for providing search results based upon a query submitted to a website that is configured to offer goods for acquisition. With more particularity, the organization to which the website corresponds need not dedicate resources to construct a search engine, as the search computing system (operated by an organization that has expertise in searching through data) provides search services. In addition, the search computing system is configured to rank search results in a personalized manner, thereby providing more relevant search results to end users. This in turn can increase conversion rates for the website.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
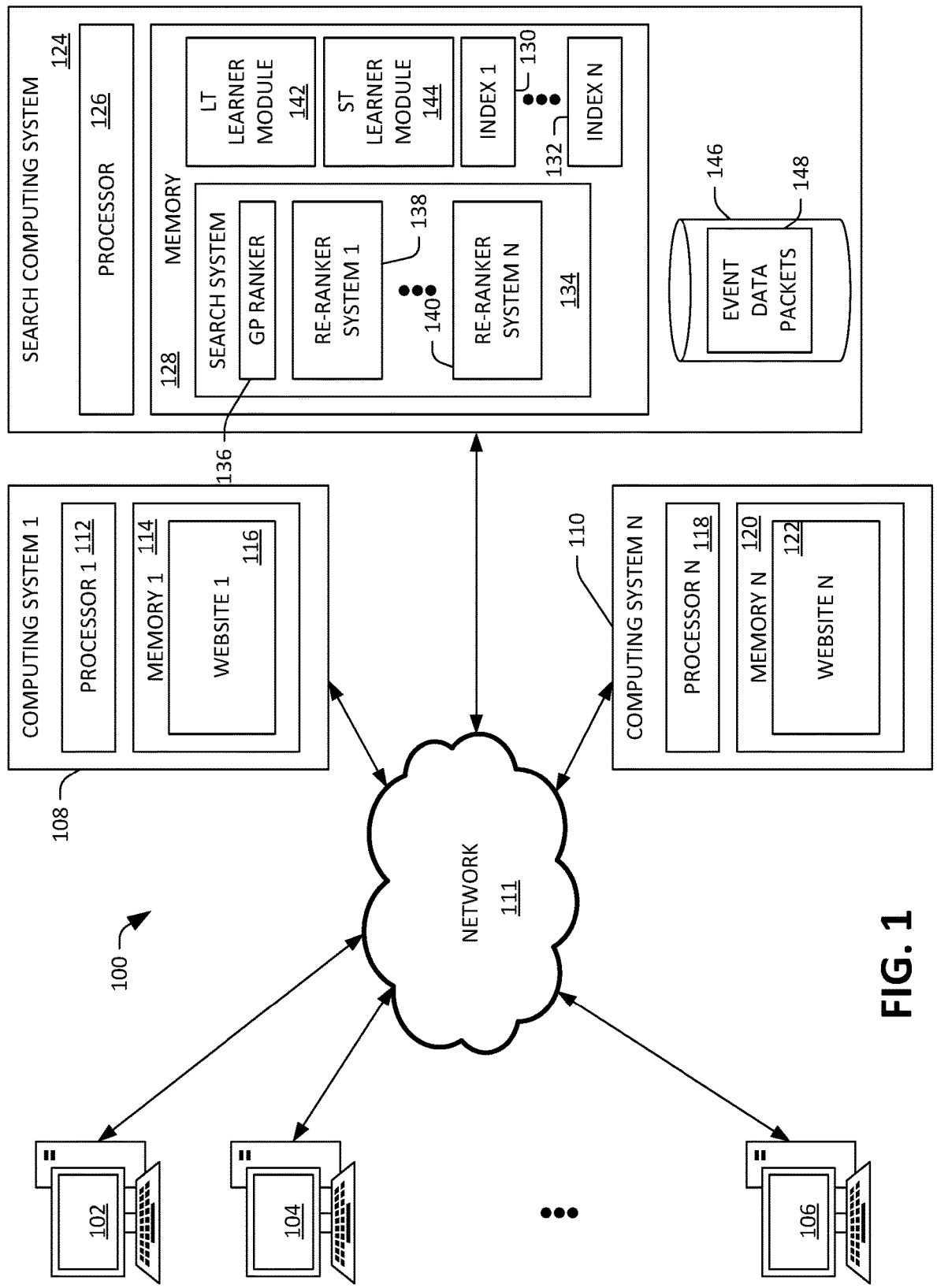
FIG. 1 is a functional block diagram of an exemplary computing system that is configured to provide personalized search results to an end user.

Various technologies pertaining to provision of personalized search results to end users are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component", "system", and "module" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

Described herein are various technologies pertaining to providing personalized search results to a user of a client computing device. Personalized search results are returned based upon a query submitted by the user to a website that offers goods for acquisition to end users. For instance, the website can be configured offer electronic devices for acquisition to end users. The website receives a query set forth by the user and, for example, a ranked list of electronic devices can be returned to the user based upon features of the query, wherein an order of the electronic devices in the ranked list is personalized for the user. Thus, if two different users were to issue the same query to the same website at the same time, two different sets of search results may be returned to the two users, with each set of search results personalized for the respective user that receives the search results.

Further, as will be described in greater detail herein, a search computing system that is separate from the website generates the personalized search results for users. Hence, the website receives the query, transmits the query to the search computing system, and the search computing system generates a ranked list of search results that is personalized for the user based upon features of the query and features of goods that are searched over. The search computing system transmits the ranked list of search results back to the website, which in turn provides the ranked list of search results to the client computing device that was employed by the user to submit the query.

With reference now to FIG. 1, a functional block diagram of an exemplary system 100 that is configured to create a ranked list of goods that is personalized for a user who set forth a query is illustrated. The system 100 includes several client computing devices 102-106 that are operated by respective users. The client computing devices 102-106 can be desktop computing devices, laptop computing devices, tablet computing devices, smart speakers, mobile telephones, wearable computing devices, or the like.

The system 100 additionally includes a plurality of computing systems 108-110, wherein the computing systems 108-110 host respective websites of organizations that offer goods for acquisition by way of such websites, and further wherein the client computing devices 102-106 are in communication with the computing system 108-110 by way of a network 111. With more particularity, the first computing system 108 includes a first processor 112 and first memory 114, wherein the first memory 114 has a first website 116 loaded therein. The Nth computing system 110 includes an Nth processor 118 and Nth memory 120, wherein the Nth memory 120 has an Nth website 122 loaded therein. The websites 116 and 122 can each include a plurality of webpages. Further, each of the websites 116 and 122 can be configured to facilitate sales of goods to users of the client computing devices 102-106. In an example, the first website 116 can be configured to facilitate sale of electronic devices to users of the client computing devices 102-106. In another example, the Nth website 122 can be configured to facilitate sale of healthcare plans to users of the client computing devices 102-106. Thus, the goods offered for sale by way of the websites 116 and 122 can be tangible goods (such as electronic devices) and intangible goods (such as healthcare plans).

The system 100 additionally comprises a search computing system 124 that is in communication with the computing systems 108-110 and the client computing devices 102-106 by way of the network 111. The search computing system 124 provides backend search services for each of the websites 116 and 122. Thus, in an example, the search computing system 124 can generate first search results based upon a first query received by the computing system 108 from the first client computing device 102, and the search computing system 124 can generate second search results based upon a query received by the Nth computing system 110 from the second client computing device 104. Hence, even though the websites 116 and 122 are for different organizations and are configured to facilitate sale of different goods, the search computing system 124 provides backend search services for both of the websites 116 and 122.

The search computing system 124 includes a processor 126 and memory 128, wherein the memory 128 includes systems and modules that are collectively configured to generate personalized search results for users of the client computing devices 102-106 who submit queries to the websites 116 and 122 hosted by the computing systems 108 and 110, respectively. The memory 128 includes indices 130-132 of goods that are available for acquisition by users of the client computing devices 102-106 by way of the websites 116 and 122. More specifically, the first index 130 is an index of goods that are available for acquisition by way of the first website 116 and the Nth index 132 is an index of goods are available for acquisition by way of the Nth website 122. The indices 130-132 can include identities of goods that are available for acquisition and values that represent features of such goods. Therefore, in an example, when the first website 116 is configured to facilitate sale of electronic devices, the first index 130 can include identities of electronic devices and values that represent features of such electronic devices. Exemplary features include, for instance, a screen size of a television, a screen size of a mobile telephone, a brand of the mobile telephone, an operating system of the mobile telephone, and so forth. In addition, as will be described below, a feature of a good can include a cohort of users that is assigned to the good, wherein the cohort represents a group of users that are likely to be interested in purchasing the good (based upon marketing and/or past user behavior).

The memory 128 further includes a search system 134, wherein the search system 134 includes a general-purpose ranker 136 and N re-ranker systems 138-140. The general-purpose ranker 136 is configured to output an initial ranking of goods based upon a query, wherein the general-purpose ranker 136 is employed to output the initial ranking regardless of which website the query is received from (and therefore regardless as to which of the indices 130-132 is searched). The N re-ranker systems are respectively assigned to the N websites 116 and 122. Thus, the first re-ranker system 138 is assigned to the first website 116 and is configured to rank goods represented in the first index 130, while the Nth re-ranker system 140 is assigned to the Nth website 122 and is configured to rank goods represented in the Nth index 132.

Figure 2:
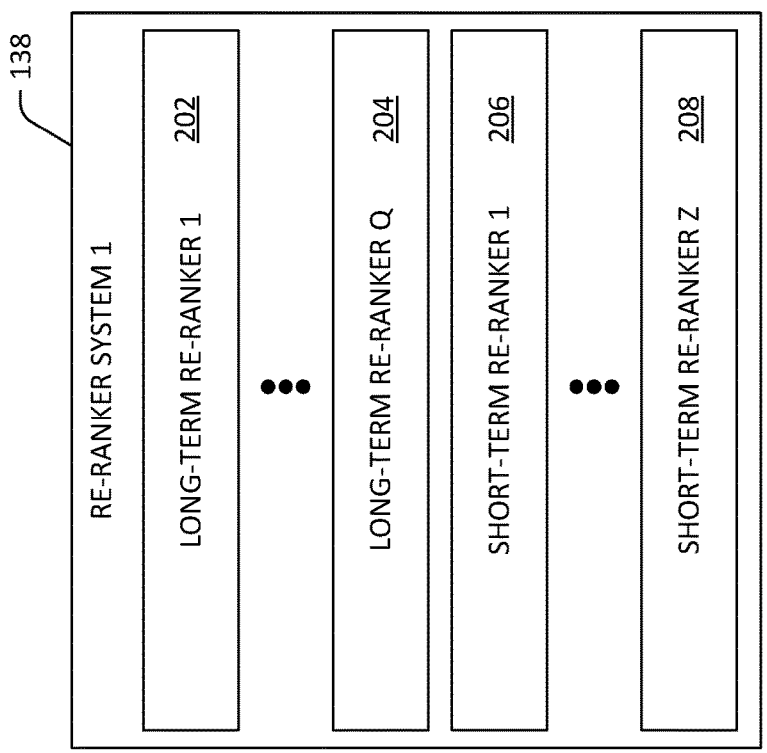
FIG. 2 is a functional block diagram of an exemplary re-ranker system.

Referring briefly to FIG. 2, a functional block diagram of the first re-ranker system 138 is illustrated. The first re-ranker system 138 includes a plurality of long-term re-rankers 202-204. Each of the long-term re-rankers 202-204 is assigned to a respective user and is trained to re-rank search results output by the general-purpose ranker 136 based upon historic observations about the users when such users interacted with webpages of the websites 116 and 122. Accordingly, for instance, the first long-term re-ranker 202 can be assigned to a first user, a second long-term re-ranker in the re-ranker system 138 can be assigned to a second user, a third long-term re-ranker can be assigned to a third user, the Qth long-term re-ranker 204 can be assigned to a Qth user, and so forth. The first re-ranker system 138 may also optionally include a plurality of short-term re-rankers 206-208, wherein each of the short-term re-rankers 206-208 is assigned to a respective user, and further wherein a short-term re-ranker is constructed to re-rank search results output by a long-term re-ranker (or the general-purpose ranker 136) based upon recent interactions of a user with webpages in the first website 116. In an example, the short-term re-rankers 206-208 can be session-specific re-rankers. Thus, for example, the first short-term re-ranker 206 can be assigned to a first user of the first client computing device 102 during a session of the first user with the first website 116, while the Zth short-term re-ranker 208 can be assigned to a Zth user of a Zth client computing device during a session of the Zth user with the first website 116. As will be described in greater detail herein, the long-term re-rankers 202-204 are configured to receive output of the general-purpose ranker 136, and the short-term rankers 206-208 are configured to receive output of a respective one of the long-term re-rankers 202-204. As will be described in greater detail herein, the search system 134 is configured to provide generate search results that are ranked in a personalized manner for an issuer of a query received by the search system 134.

Returning to FIG. 1, the search computing system 124 additionally comprises a data store 146 that comprises event data packets 148, wherein the event data packets are representative of events undertaken by users with respect to webpages of the websites 116 and 122. The memory 128 further includes a long-term learner module 142 that is configured to train the long-term re-rankers 202-204 based: 1) profile information for users of the websites 116 and 122 provided to the search computing system 124 by the computing systems 108-110; and/or 2) event data packets in the event data packets 148 generated by the client computing devices 102-106 and provided to the search computing system 124. The memory 128 also includes a short-term learner module 144 that is configured to construct the short-term re-rankers 206-208 based upon event data packets generated by the client computing devices 102-106 during user sessions with the websites 116 and 122. Thus, as indicated previously, the short-term learner module 144 can construct and/or train a short-term ranker for a website that is assigned to a user based upon recent interactions of the user with webpages of the website.

Figure 3:
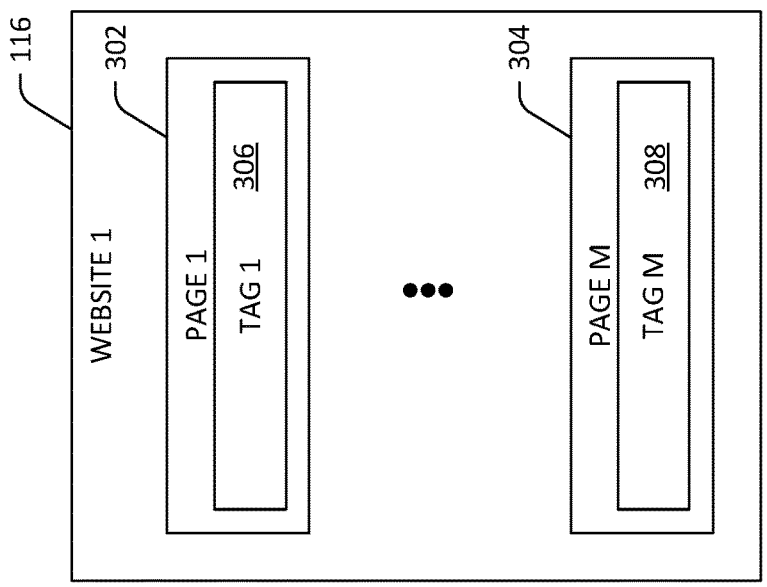
FIG. 3 is a schematic that depicts an exemplary website.

Referring briefly to FIG. 3, a functional block diagram of the first website 116 is illustrated. The first website 116 includes a plurality of pages 302-304. The pages 302-304 include respective tags 306-308: the first page 302 includes a first tag 306 and the Mth page 304 includes an Mth tag 308. The tags 306-308 include computer-executable code (e.g., written in a scripting language) that, when executed by a client computing device, causes the client computing device to generate an event data packet and transmit the event data packet to the search computing system 124 (or an intermediate system, such as an advertising system, which in turn transmits the event data packet to the search computing system 124). The event data packet is representative of an interaction of the user with respect to the page that includes the tag. For example, the first page 302 may be retrieved by the first client computing device 102, wherein the first page 302 comprises the first tag 306. The first tag 306 includes computer executable code that is executed by the first client computing device 102 upon an application on the first client computing device 102 loading the first page 302. For example, the application may be a web browser, a mobile application or the like. The first client computing device 102, upon executing the first tag 306, generates an event data packet that is representative of an interaction undertaken by the user of the client computing device 102 with respect to the first website 116. The computer-executable code of the first tag 306, when executed by the first client computing device 102, then causes the first client computing device 102 to transmit the event data packet to the search computing system 124 (or some intermediate computing system that is in communication with the search computing system 124). As will be described in greater detail below, the long-term learner module 142 can train a long-term re-ranker for the user of the first client computing device 102 based upon content of the event data packet. In addition, the short-term learner module 144 can construct and/or train a short-term re-ranker for the user of the first client computing device 102 based upon content of the event data packet.

Figure 4:
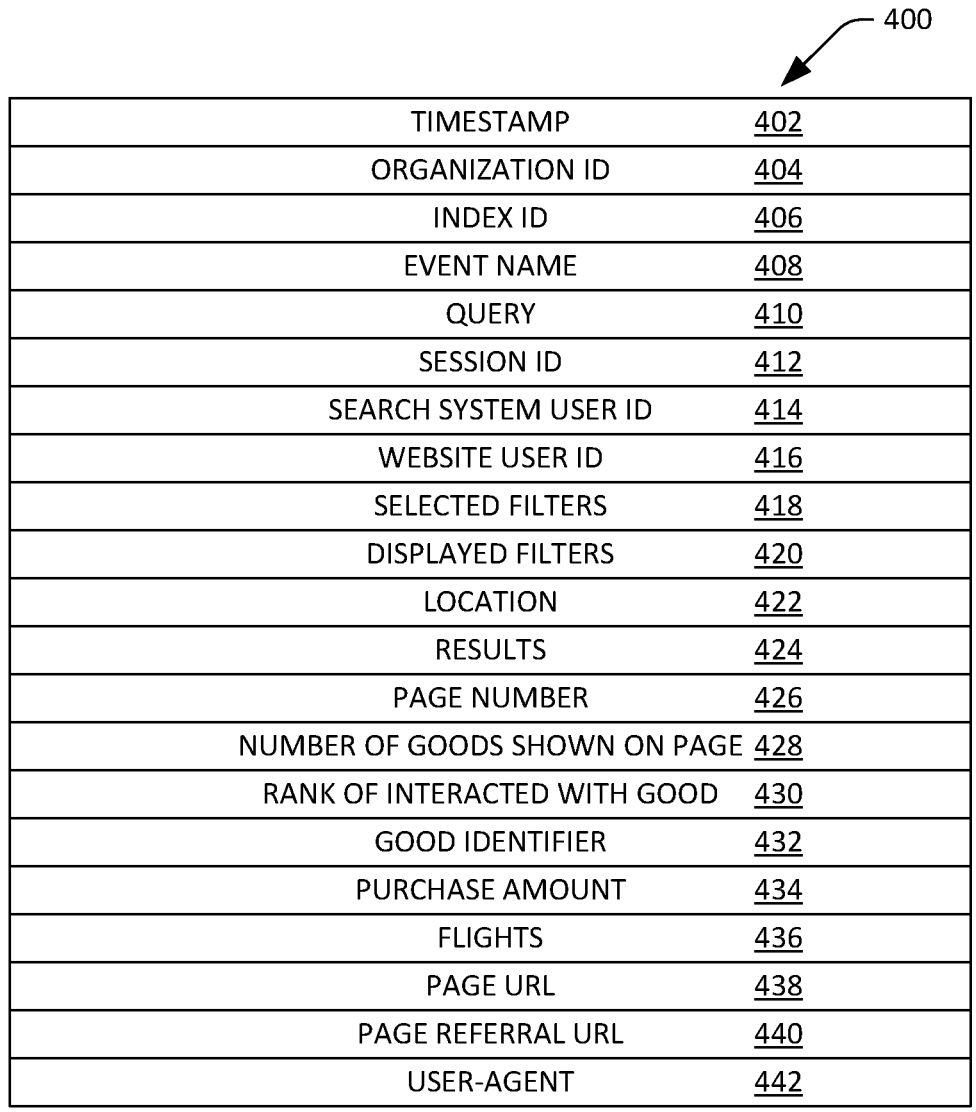
FIG. 4 illustrates an exemplary event data packet.

Referring now to FIG. 4, an exemplary event data packet 400 that is constructed by a client computing device upon executing a tag in a page of a website is illustrated. The event data packet 400 comprises a first field 402 that includes a timestamp, wherein the timestamp is indicative of a time when the event data packet 400 was generated. The event data packet 400 also includes a second field 404 that comprises an identifier of an organization that manages the website. In an example, the identifier of the organization may be an identifier for a website. A third field 406 of the event data packet 400 comprises an identifier of an index that is assigned to the website. A fourth field 408 of the event data packet includes a name of an event undertaken with respect to a page on the website. The event name may indicate that the user clicked a link, set forth a query, completed a purchase, added an item to a cart for purchase, selected a "back" button, etc.

A fifth field 410 of the event data packet 400 can include a query submitted by user, wherein the query corresponds to the event identified in the fourth field 408. A sixth field 412 includes an identifier of a session of the user with the website. A session with the website can begin, for example, when a user initially loads a page that belongs to the website and can end when the user closes all tabs of a browser that have a page belonging to the website loaded therein. Hence, multiple event data packets for a user may include the same session identifier. A seventh field 414 of the event data packet 400 can include a user identifier for the search computing system 124. Accordingly, event data packets generated based upon user interactions with pages belonging to different websites may include a same search system user identifier. An eighth field 416 comprises a user identifier for the website that corresponds to the event data packet 400. The website user identifier is known when the user has provided login credentials to the website.

A ninth field 418 of the event data packet 400 can include identifiers for filters selected by the user when conducting a search for goods. For instance, a website that is configured to facilitate sale of electronics items may include filters for brand, device type, memory amount, etc., and the user can select such filters when conducting a search for goods. A tenth field 420 can include identifiers for filters that were displayed when the event data packet 400 was generated (wherein the displayed filters can include the selected filters). An eleventh field 422 can include an identifier of a location of the client computing device. A twelfth field 424 of the event data packet 400 can include identifiers of search results (and order of the search results) returned to the user based upon a query identified in the fifth field 410.

A thirteenth field 426 can include a page number of a page that includes the tag that caused the event data packet 400 to be generated. Alternatively, the thirteenth field can include a value that indicates a number of the page within a website session (e.g., a value of "4" can indicate that the page is the fourth page presented to the user during a session of the user with the website). A fourteenth field 428 can include a value that indicates a number of goods that are displayed on the page. A fifteenth field 430 can identify a rank of a good shown on the page that was interacted with by the user (when the user interacted with a good). A sixteenth field 432 can include an identifier of a good that was interacted with by the user.

A seventeenth field 434 can include a purchase amount when the event data packet 400 represents purchase of a good. An eighteenth field 436 can include an identifier for an advertisement flight associated with the event data packet 400, and a nineteenth field 438 can include a Uniform Resource Locator (URL) URL of the page that includes the tag. A twentieth field 440 of the event data packet 400 includes a URL of a referral page (a page that the user was on prior to reaching the page), and a twenty-first field 442 can include an identifier of a user agent (e.g., an identifier of a web browser or application that loads the webpage at the client computing device). It is to be understood that the fields depicted in the event data packet 400 may include null values depending upon the event that is represented by the event data packet 400. In addition, an event data packet may include more or fewer fields than what is depicted in the exemplary event data packet 400.

Returning to FIG. 1, exemplary operation of the system 100 is now described. Initially, generation and/or training of the general-purpose ranker 136, the long-term rankers 202-204, and the short-term rankers 206-208 is described. When the organizations that manage the websites 114 and 122 request that the search computing system 124 be employed to provide personalized search results to users, the organizations can provide user profile information to the search computing system 124. For example, the first computing system 108 can maintain a website user profile for a first user, wherein the website user profile can include information such as goods purchased by the user by way of the first website 116, goods placed in a cart to be purchased by way of the first website 116, goods returned by the user by way of the first website 116, and so forth. The first computing system 108 can provide this website user profile to the search computing system 108. In addition, the computing systems 108-110 can provide catalogs of goods to the search computing system 124, and the search computing system 124 can construct the indices 130-132 based upon such catalogs of goods. The catalogs of goods can include identifiers for goods and values that represent features of such goods.

The long-term learner module 142 can, for a user and a website, construct a user profile based upon a website user profile received from the website and further based upon event data packets in the event data packets 148 that include an identifier for the user. Therefore, the search computing system 124 can generate multiple user profiles for a single user, as the user may interact with multiple websites that are associated with the search computing system 124. A user profile may include information such as previous goods purchased by the user, goods placed in a cart by the user, times when goods were purchased and/or placed in the cart by the user, attributes of the user (e.g., age, gender, location), and so forth.

The search computing system 124 can assign each user to a respective cohort, wherein users in a cohort share one or more attributes. For instance, a first cohort can include users who are from a same location (e.g., a same state). In another example, a second cohort can include users who are in a same age range. In yet another example, a third cohort can include users who share a group of attributes, such as location and age. The search computing system 124 can assign a user to a cohort based upon content of user profile(s) of the user. Thus, each user is assigned to at least one cohort. Responsive to users being assigned to cohorts, the search computing system 124 can enrich an index of goods with cohort identifiers, such that a good in the index of goods has one or more cohorts assigned thereto. In a specific example, the first index 130 can be an index of electronic devices and can include an identifier for a large screen television. The search computing system 124, based upon an analysis of user profiles of users assigned to a first cohort, can ascertain that users in the first cohort have historically often purchased large screen televisions. The search computing system 124 can update the first index 130, wherein the first cohort is assigned to the large screen television in the first index 130.

The general-purpose ranker 136 can be trained based upon user cohorts assigned to goods in the indices 130-132 and content of the user profiles constructed by the search computing system 124 (across the websites 114 and 122). Therefore, the general-purpose ranker 136 is trained such that the general-purpose ranker is optimized with respect to user profile(s) across the websites 116 and 122.

The long-term learner module 142 constructs personalized (long-term re-rankers) for users based upon the user profiles generated for the users. For instance, the search computing system 124 constructs a first user profile for a first user and the first website 116. The long-term learner module 142 constructs and/or trains a first long-term re-ranker for the first user based upon the first user profile. The long-term learner module 142 can, from time to time, update the first long-term re-ranker based upon event data packets (in the event data packets 148) generated by one or more client computing devices employed by the first user.

Generation and collection of the event data packets 148 is now described. For example, a user of the first client computing device 102 can direct a browser executing on the first client computing device 102 to load the first page 302 of the first website 116. The browser, upon loading the first page 302, executes computer-executable code in the first tag 306 of the first page 302, thereby causing the first client computing device 102 to construct an event data packet and transmit the event data packet by way of the network 111 to the search computing system 124. The search computing system 124, upon receiving the event data packet, stores the event data packet in the event data packets 148 (for subsequent use in updating the user profile for the user, which is in turn employed to update the long-term ranker assigned to the user). In addition, the short-term learner module 144 can optionally construct and/or train a short-term ranker for the user based upon the received event data packet.

The user of the first client computing device 102 may then perform some action with respect to the first page 302, thereby causing the first client computing device 102 to retrieve a second page of the website 116, whereupon the second page is loaded by the browser that is executing on the first client computing device 102. The browser executes a tag of the second page, which causes the first client computing device 102 to construct a second event data packet and transmit the second event data packet by way of the network 111 to the search computing system 124. Again, the search computing system 124 places the received event data packet in the data store 146, and additionally provides the event data packet to the short-term learner module. The short-term learner module 144 then updates the short-term re-ranker based upon the newly received event data packet. Accordingly, as the user interacts with pages of the first website 116, the client computing device 102 generates event data packets that correspond to such interactions and transmits the event data packets to the search computing system 124.

The second client computing device 104 can retrieve a page belonging to the Nth website 122 and load such page in a browser executing on the second client computing device 104 for example. The page of the Nth website 122 includes a tag that comprises computer-executable code, wherein the browser executes such code, which causes the second client computing device 104 to generate an event data packet. The second client computing device 104 transmits such event data packet to the search computing system 124, which places the event data packet in the data store 146 and additionally provides the event data packet to the short-term learner module 144. The short-term learner module 144 constructs and/or trains a second short-term ranker for the second user based upon the received event data packet. Thus, the long-term learner module 142 updates a long-term ranker for a user from time to time based upon event data packets in the event data packets 148, while the short-term learner module 144 constructs and/or trains a short-term ranker for a user immediately upon the search computing system 124 receiving the event data packet.

Again, the long-term learner module 142 can construct and/or train the Q long-term re-rankers 202-204 based upon received website user profiles and event data packets received from the client computing devices 102-106. The long-term learner module 142 can utilize any suitable machine learning techniques in connection with training the long-term re-rankers of the re-ranker systems 138-140.

The short-term learner module 144 can construct and/or train a short term re-ranker for a user based upon timestamps in the first field 402 of event data packets, session identifiers in the sixth field 412 of event data packets, search system user identifier in the seventh field 414 of event data packets, and/or a website user identifier in an eighth field 416 of event data packets. Thus, the short-term learner module 144 can construct and/or train a short-term re-ranker for a user based upon event data packets that have been received from a client computing device with the same session identifier and/or within some threshold amount of time from a most recently received event data packet. For example, when a user has selected links that correspond to goods of a particular brand during a session with a website, the short-term learner module 144 can learn a short-term re-ranker that boosts a good of the brand (over a good of some other brand).

Exemplary operation of the system 100 with respect to a query set forth by a user of a client computing device is now described. In an example, the first client computing device 102 may have a page of the first website 116 loaded thereon, wherein the page includes a query field. The user of the first client computing device 102 sets forth a query in the query field and causes the query to be transmitted to the first computing system 108. The first computing system 108, upon receiving the query, transmits data to the search computing system 124, wherein the data comprises: 1) the query; 2) an identifier for the first website 116; and 3) an identifier for the user. The search system 134, upon receiving such data, identifies the first index 130 from amongst the indices 130-132 based upon the identifier for the website. The search system 134 searches over the first index 130 based upon the query to generate search results (a set of goods). The general-purpose ranker 136, which is used to rank goods regardless of the index that is to be searched over, ranks goods in the set of goods to generate a first ranked list goods.

The search system 134, based upon the identifier of the website received from the first computing system 108, selects a re-ranker system from amongst the re-ranker systems 138-140, wherein the selected re-ranker system is employed to re-rank the goods in the first ranked list of goods output by the general-purpose ranker 136. In this example, the search system 134 selects the first re-ranker system 138, as such re-ranker system 138 corresponds to the first website 116, Based upon the user identifier received from the first computing system 108, the search system 134 selects a long-term re-ranker from amongst the long-term re-rankers 202-204 of the first re-ranker system 138. For example, the first long-term re-ranker can be assigned to the user identifier, and accordingly the search system 134 can select the first long-term re-ranker 202 from amongst the Q long-term re-rankers 202-204.

The first long-term re-ranker 202 receives the first ranked list of goods output by the general-purpose ranker 136 and re-ranks the goods in the first ranked list of goods based upon features of the query (e.g., terms in the query, a user cohort assigned to the query based upon the identifier for the user, etc.) and further based upon features of the goods represented in the first index 130. Accordingly, the first long-term re-ranker 202 outputs a second ranked list of goods. As the first long-term re-ranker 202 has been constructed and trained based upon a website user profile for the user (for the first website 116) and/or event data packets assigned to the user, the first long-term re-ranker 202 re-ranks the search results in a manner that is customized for the user. The first long-term re-ranker 202 outputs a second ranked list of search results.

The search system 134 searches for a short-term re-ranker from amongst the short-term re-rankers 206-208 based upon the identifier for the user. When a short-term re-ranker has been constructed for the user and has thus been identified by the search system 134, the second ranked list of goods is provided to the identified short-term re-ranker and the short-term re-ranker re-ranks the goods in the second ranked list of goods to generate a third ranked list of goods. The selected short-term re-ranker can re-rank the goods in the second ranked list of goods based upon an order of goods in the second ranked list of goods, features of the received query, and features of the goods in the first index 130. The search system 134 causes the search computing system 124 to transmit a personalized ranked list of goods to the first computing system 108, whereupon the first computing system 108 transmits such personalized ranked list of goods to the first client computing device 102. The first client computing device 102 displays the personalized ranked list of goods on a display to the user of the first client computing device 102. When a short-term re-ranker has been constructed by the search computing system 124 for the user, the personalized ranked list of goods may be the third ranked list of goods referenced above. When there is no short-term re-ranker for the user, the personalized ranked list of goods may be the second ranked list of goods output by the long-term re-ranker. Similar actions occur when a query is submitted to the Nth computing system 110 by a client computing device. In such case, the search system 134 identifies an index from the indices 130-132 that represents goods that are available for acquisition by way of the Nth website 122, searches such index based upon the query, uses the general-purpose ranker 136 to generate a first ranked list of goods, identifies and employs an appropriate re-ranker to re-rank the first ranked list of goods to generate a second ranked list of goods, and optionally employs a short-term re-ranker for the user to further re-rank the goods in the second ranked list of goods to generate a third ranked list of goods. Furthermore, a similar approach can be utilized to set forth recommendations that are personalized for users. Thus, personal recommendation models can be generated for users based upon collected event data packets and the recommendation engine can recommend goods to the user based upon the personal recommendation engine.

Figure 5:
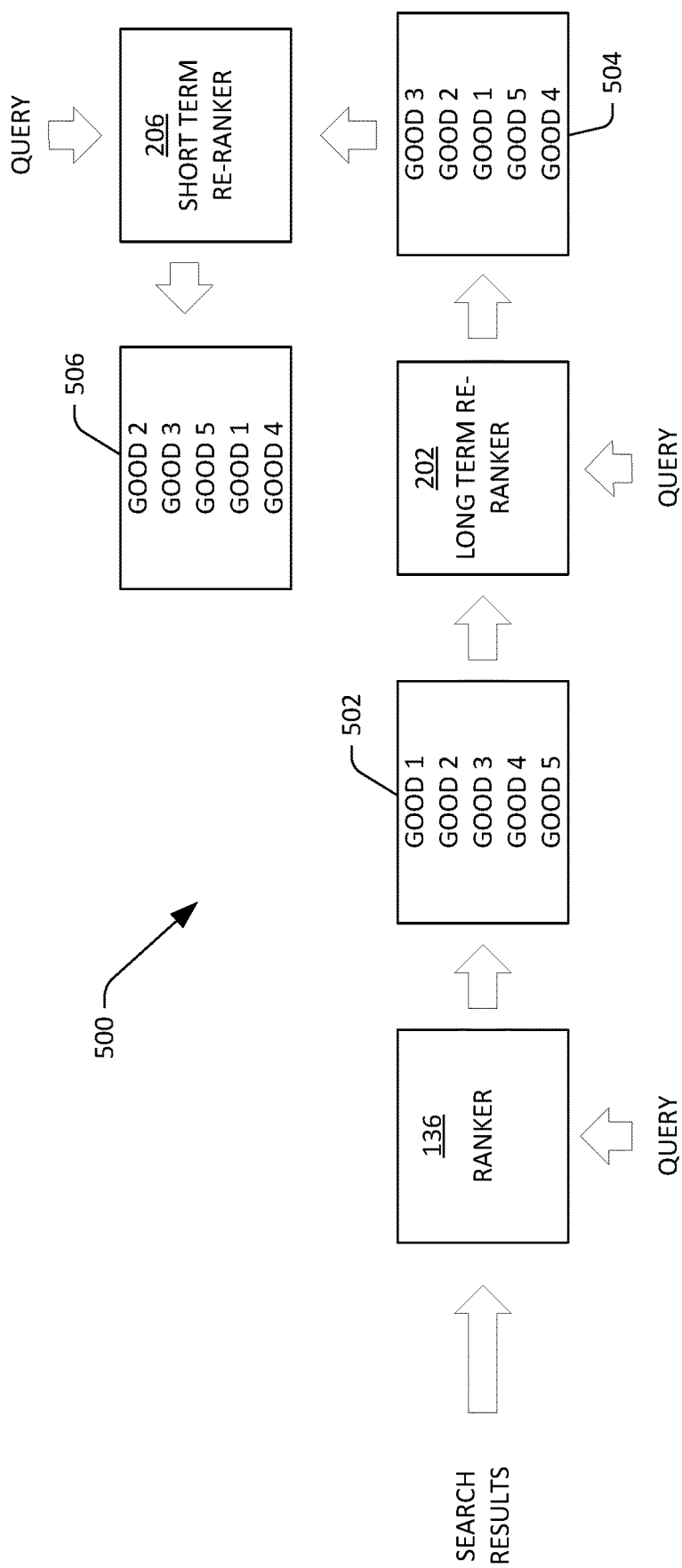
FIG. 5 is a schematic that illustrates generation of personalized search results.

Referring to FIG. 5, a schematic 500 that depicts exemplary personalized re-ranking of goods is presented. In an example depicted in the schematic 500, a set goods obtained by searching the first index 130 based upon a received query are provided to the general-purpose ranker 136. The general-purpose ranker 136 ranks the goods based upon features of the query and features of goods in the set of goods, thereby generating a first list of goods 502. The first ranked list of goods ranks GOODS 1-5 in the following order: GOOD 1, GOOD 2, GOOD 3, GOOD 4, GOOD 5. The first ranked list of goods 502 is provided to the identified long-term re-ranker 202 for the user. The identified long-term re-ranker 202 re-ranks the goods in the first ranked list of goods 502 based upon an order of the goods in the first ranked list of goods 502, features of the query, and features of the goods from the first index 130. The long-term re-ranker 202 outputs a second ranked list of goods 504, wherein the second ranked list of goods has GOODS 1-5 in the order of: GOOD 3, GOOD 2, GOOD 1, GOOD 5, GOOD 4. Thus, the personalized long-term re-ranker 202 has moved GOOD 3 to the topmost position in the second ranked list of goods 504.

The second ranked list of goods 504 is provided to the identified short-term re-ranker 206. The short-term re-ranker 206 re-ranks the goods in the second ranked list of goods to generate a third ranked list of goods 506. The short-term re-ranker 206 re-ranks search results in the second ranked list of goods 504 based upon an order of goods in the second ranked list of goods 504, features of the query, and features of the goods in the first index 130. In the third ranked list of goods 506, it can be ascertained that the short-term re-ranker 206 has moved GOOD 2 to the topmost position.

Figure 6:
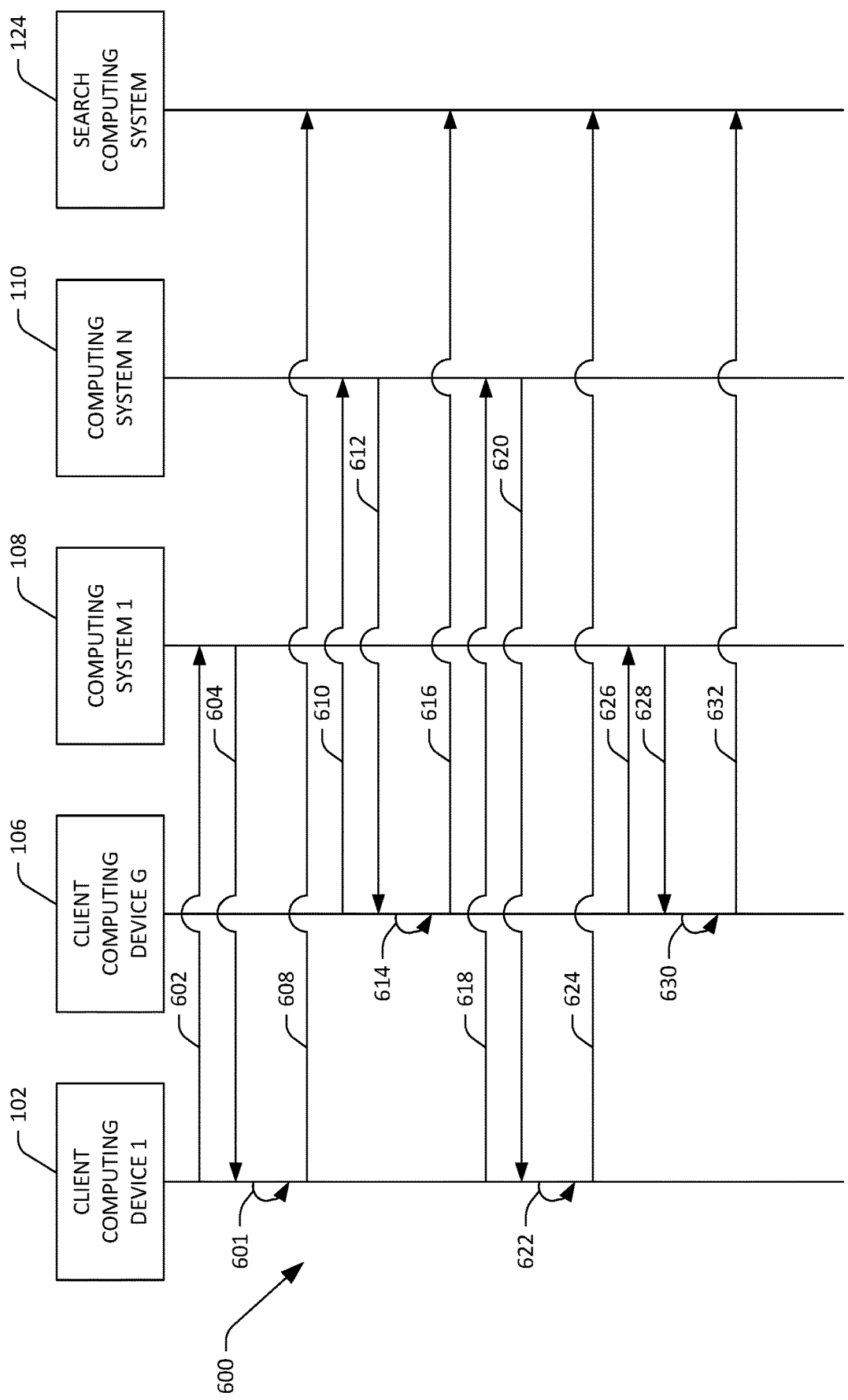
FIG. 6 is a communications diagram that illustrates communications undertaken between computing devices and systems with respect to a search computing system receiving event data packets from client computing devices.

Now referring to FIG. 6, a communications diagram illustrating exemplary communications undertaken between devices and systems in the system 100 is illustrated. At 602, the first client computing device 102 transmits a request for a page belonging to the first website 116 (hosted by the first computing system 108) to the first computing system 108. At 604, the first computing system 108 transmits the requested page to the client computing device 102. At 606, based upon a tag included in the received page, the first client computing device 102 generates an event data packet. At 608, the event data packet is transmitted to the search computing system 124. At 610, the Gth client computing device 106 transmits a request for a page of the Nth website 122 (hosted by the Nth computing system 110) to the Nth computing system 110. At 612, the Nth computing system 110 transmits the requested page to the Gth client computing device 106. At 614, based upon a tag included in the received page, the Nth client computing device generates an event data packet. At 616, the Gth client computing device 106 transmits the event data packet to the search computing system 124. At 618, the first client computing device 102 transmits a request for a page belonging to the Nth website 122 to the Nth computing system 110. At 620, the Nth computing system 110 transmits the requested page to the first client computing device 102. At 622, based upon a tag in the requested page, the first client computing device 102 generates an event data packet. At 624, the first client computing device 102 transmits the event data packet to the search computing system 124.

At 626, the Gth client computing device 106 transmits a request for a page of the first website 116 to the first computing system 108. At 628, the first computing system 108 transmits the requested page to the Gth client computing device 106, and at 630 the Gth client computing device 106 generates an event data packet based upon a tag in the received page. At 632, the Gth client computing device 106 transmits the event data packet to the search computing system 124. The communications diagram 600 has been set forth to illustrate that a client computing device can generate event data packets and transmit such event data packets to the search computing system 124 based upon interactions of a user of the client computing device with pages that belong to different websites. This can allow the search computing system 124 to construct a fairly robust model of the user, thereby resulting in the search computing system 124 being able to provide better search results when compared to conventional approaches and better recommendations when compared to conventional approaches.

Figure 7:
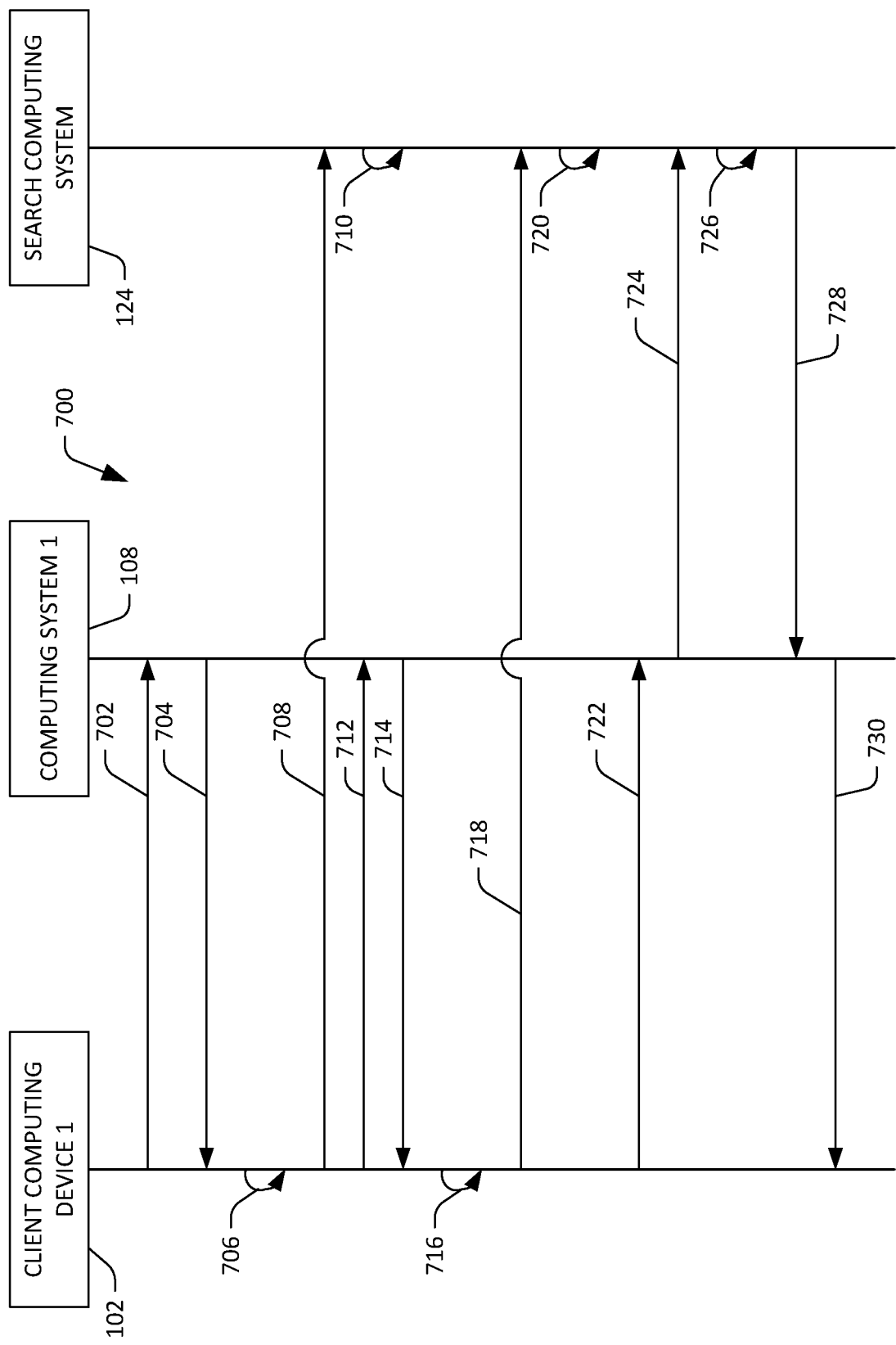
FIG. 7 is a communications diagram that illustrates communications undertaken between computing devices and systems in connection with providing personalized search results to an end user.

Now referring to FIG. 7, a communications diagram 700 that depicts exemplary communications between the first client computing device 102, the first computing system 108, and the search computing system 124 is depicted. At 702, the first client computing device 102 transmits a request to the first computing system 108 for a page that belongs to the first website 116. At 704, the first computing system 108 transmits the page to the first client computing device 102. At 706, based upon a tag in the page, the first client computing device 108 generates an event data packet, and at 708 the first client computing device 102 transmits the event data packet to the search computing system 124.

At 710, based upon the received event data packet, the search computing system 124 constructs a short-term re-ranker for the user of the first client computing device 102. At 712, the first client computing device 102 transmits a request for a second page to the first computing system 108, wherein the second page belongs to the first website 116. For example, a user may have clicked on a selectable link that represents a good that is of interest to the user, thereby resulting in the request for the second page. At 714, the first computing system 108 transmits the second page to the first client computing device 102. At 716, based upon a second tag in the second page, the first client computing device 102 constructs a second event data packet. At 718, the first client computing device 102 transmits the second event data packet to the search computing system 124.

At 720, based upon the received second event data packet, the search computing system 124 updates the short-term re-ranker. At 722, the first client computing device 102 transmits a query to the first computing system 108, and at 724, the first computing system 108 transmits the query (and a user identifier and identifier of the first website 116) to the search computing system 124. At 726, the search computing system 124 generates a personalized ranking of goods for the user based upon the query. As described in detail above, the search computing system 124 can employ a general-purpose ranker, a personalized long-term re-ranker, and a personalized short-term re-ranker to generate the personalized ranking of goods. At 728, the search computing system 124 transmits the personalized ranking of goods to the first computing system 108, and at 730 the first computing system 108 transmits the personalized ranking of goods back to the first client computing device 102, whereupon the personalized ranking of goods is presented to the user of the first client computing device 102.

Figure 8:
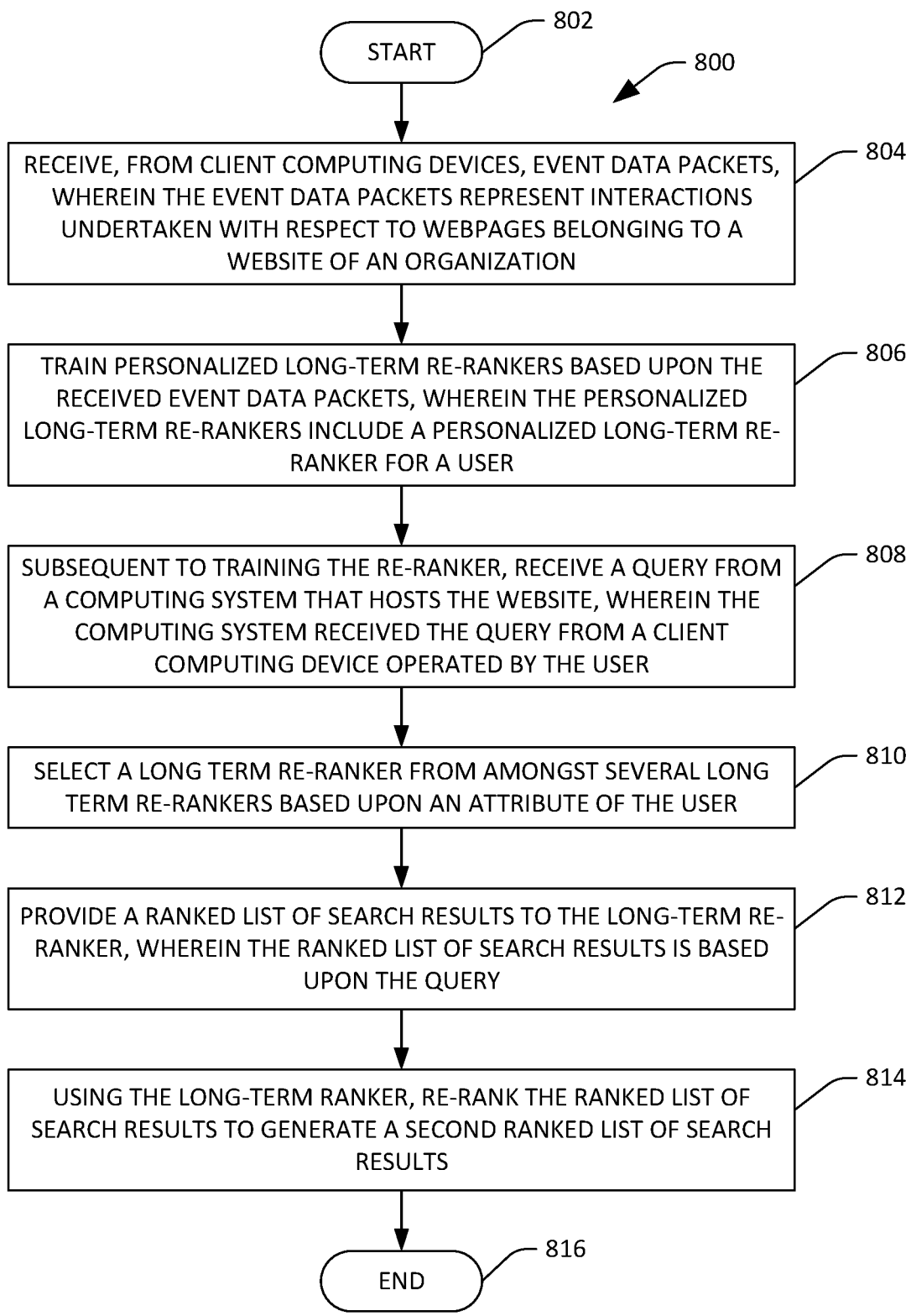
FIG. 8 is a flow diagram illustrating an exemplary methodology for providing personalized ranking of search results to an end user.
Figure 9:
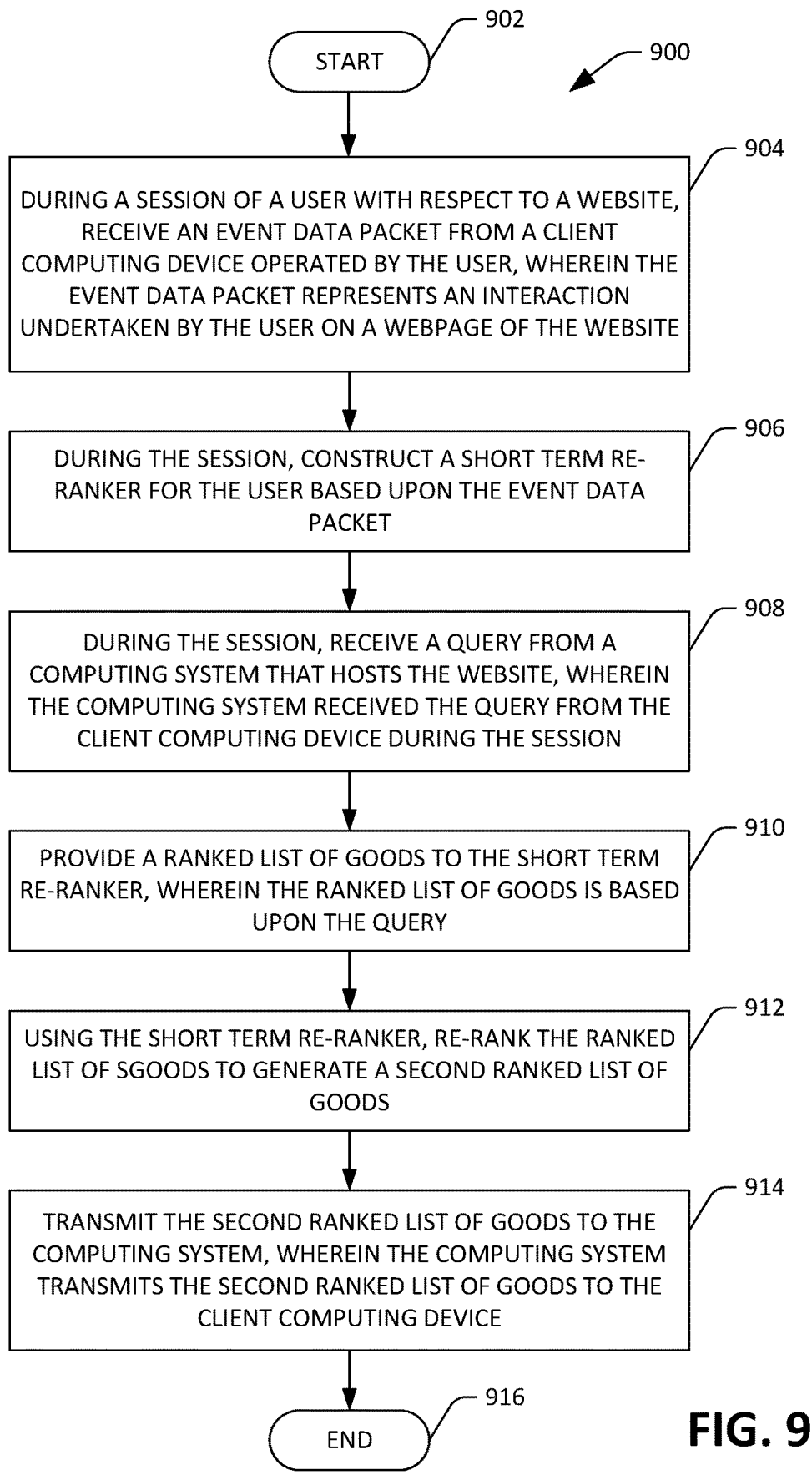
FIG. 9 is a flow diagram illustrating an exemplary methodology for providing a personalized ranked list of goods to an end user.

FIGS. 8 and 9 illustrate exemplary methodologies relating to generating personalized ranking of goods for users who submit queries to websites, wherein goods for are available for acquisition by way of such websites. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Now referring solely to FIG. 8, a flow diagram illustrating an exemplary methodology 800 for generating a personalized ranking of goods for a user is illustrated. The methodology 800 starts at 802, and at 804 event data packets are received from client computing devices, wherein the event data packets represent interactions undertaken by users of the client computing devices with respect to webpages belonging to a website of an organization. At 806, personalized long-term re-rankers are trained based upon the received event data packets, wherein the personalized long-term re-rankers are each personalized for a respective user. As described above, the search computing system 124 can generate and/or update a user profile based upon event data packets that include an identifier for the user, and the long-term learner module 142 can construct and/or train a personalized long-term re-ranker for the user based upon the user profile.

At 808, subsequent to training the long-term re-rankers, a query is received from a computing system that hosts the website, wherein the computing system receives the query from a client computing device that is operated by the user. At 810, a long-term re-ranker is selected from amongst several long-term re-rankers based upon an identifier for the user received from the computing system. At 812, a ranked list of goods is provided to the long-term re-ranker, wherein the ranked list of goods is provided based upon the query. As described above, a general-purpose ranker can output the ranked list of goods, wherein the general-purpose ranker can be employed to rank search results regardless of the index that the search results are retrieved from. At 814, using the long-term re-ranker, goods in the ranked list of goods are re-ranked to generate a second ranked list of goods. Subsequently, a personalized ranked list of goods can be transmitted to the computing system, whereupon the computing system transmits the personalized ranked list of goods to the client computing device. In an example, the personalized ranked list of goods may be the second ranked list of goods output by the long-term re-ranker. In another example, the personalized ranked list of goods may be based upon the second ranked list of goods output by the long-term re-ranker. For instance, a short-term re-ranker may generate a third ranked list of goods based upon the second ranked list of goods, and the personalized ranked list of goods may be the third ranked list of goods. The methodology 800 completes at 816.

With reference now to FIG. 9, a flow diagram illustrating an exemplary methodology 900 for generating a personalized ranked list of goods for an end user is illustrated. The methodology 900 starts at 902, and at 904 during a session of a user with a website an event data packet is received from a client computing device operated by the user, wherein the event data packet represents an interaction undertaken by the user on a webpage of the website. Such interaction may be submission of a query, selection of a good that is available for acquisition by way of the webpage, placing a good in a cart in the webpage, and so forth. At 906, during the session, a short-term re-ranker is constructed for the user based upon the event data packet.

At 908, during the session, a query is received from a computing system that hosts the website, wherein the computing system received the query from the client computing device during the session. Accordingly, the user has interacted with goods available for acquisition by way of the website and the short-term re-ranker has been constructed based upon such interaction(s) during the session. At 910, a ranked list of goods is provided to the short-term re-ranker, wherein the ranked list of goods is based upon the query. At 912, using the short-term re-ranker, the ranked list of goods is re-ranked to generate a second ranked list of goods. At 914, the second ranked list of goods is transmitted to the computing system, wherein the computing system transmits the second ranked list of goods to the client computing device for presentment to the user. The methodology 900 completes 916.

Figure 10:
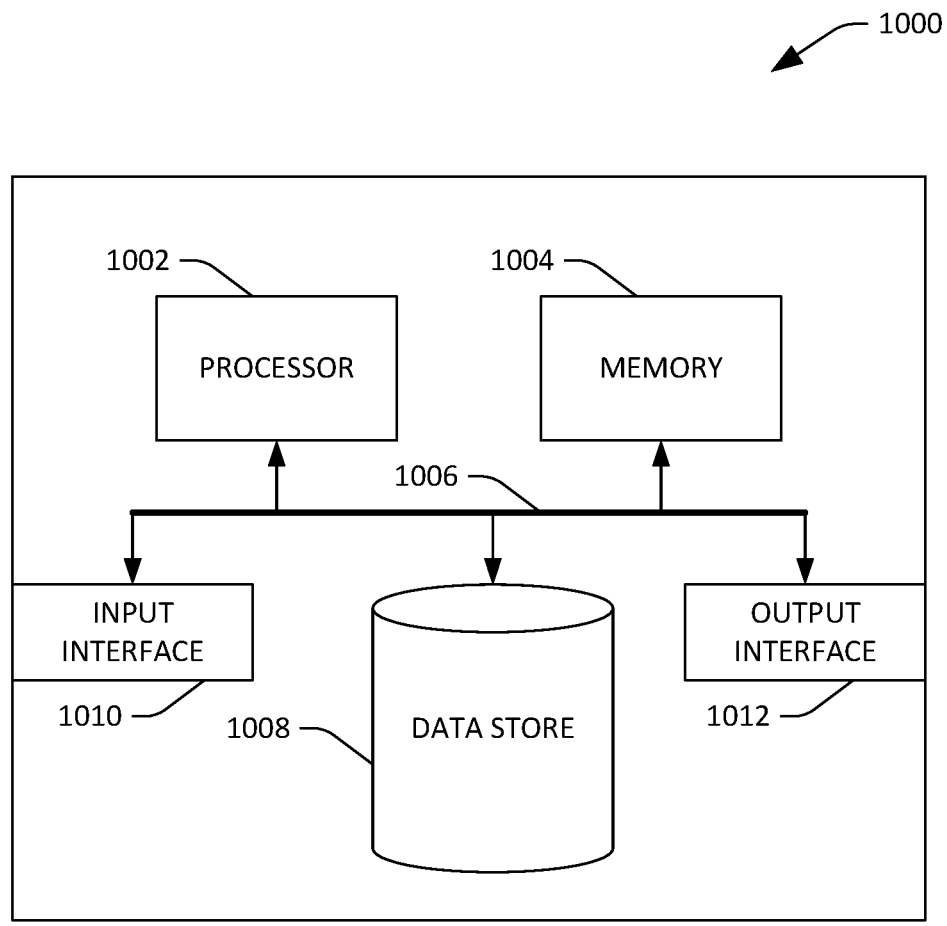
FIG. 10 depicts an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that hosts a website. By way of another example, the computing device 1000 can be used in a system that is configured to provide personalized lists of goods to a user who submits a query to a website. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store indices that are to be searched over, event data packets, user profiles, etc.

The computing device 1000 additionally includes a data store 1008 that is accessible by the processor 1002 by way of the system bus 1006. The data store 1008 may include executable instructions, event data packets, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A search computing system comprising:
a processor; and
memory storing instructions that, when executed by the processor, cause the processor to perform acts comprising:
receiving data from a computing system that hosts a website for an organization that is offering goods for acquisition by way of the website, wherein the data includes an identifier for a user and a query submitted by the user to the computing system, wherein the data is transmitted by the computing system to the search computing system in response to the computing system receiving the query from a client computing device that is operated by the user, and further wherein the search computing system and the computing system are operated by different entities;
in response to receipt of the query, selecting an index stored in computer-readable storage of the search computing system, where the index is assigned to the website, the index includes identifiers of goods offered for acquisition by way of the website and features of the goods, and further wherein the index is selected from amongst several different indexes that are assigned to respective websites that are operated by different organizations;
searching the index based upon the query to generate a set of goods, wherein the set of goods is from amongst the goods offered for acquisition by way of the website;
ranking, by a general-purpose ranker, goods in the set of goods to generate a first ranked list of goods, wherein the general-purpose ranker ranks the goods in the set of goods based upon the query and the features of the goods in the set of goods, and further wherein the general-purpose ranker is employed to generate ranked lists of goods for the respective websites regardless of which of the indexes of the respective websites is searched;
selecting a long-term re-ranker from amongst several different long-term re-rankers, the long-term re-ranker selected based upon the identifier for the user of the client computing device;
re-ranking, by the long-term re-ranker, the goods in the first ranked lists of goods to generate a second ranked list of goods, wherein the long-term re-ranker re-ranks the goods in the first ranked list of goods based upon:
an order of the goods in the first ranked list of goods;
the query;
the features of the goods in the index; and
information that is indicative of features of goods that have been historically of interest to the user; and
transmitting a personalized ranked list of goods from the search computing system to the computing system, wherein the personalized ranked list of goods is based upon the second ranked list of goods, and further wherein the personalized ranked list of goods is transmitted by the computing system to the client computing device for presentment to the user in a webpage of the website response to the computing system receiving the personalized ranked list of goods from the search computing system.

2. The search computing system of claim 1, the acts further comprising:
prior to receiving the data, receiving an event data packet from the client computing device, wherein the event data packet represents an interaction of the user with a webpage of the website; and
prior to receiving the data, training the long-term re-ranker based upon the event data packet.

3. The search computing system of claim 2, wherein the data is received during a session of the user with the website, wherein the event data packet is received during a previous session of the user with the website, and further wherein the long-term re-ranker is trained subsequent the previous session and prior to the session.

4. The search computing system of claim 1, wherein the data is received during a session of the user with the website, the acts further comprising:
prior to receiving the data, receiving an event data packet from the client computing device, wherein the event data packet represents an interaction of the user with a webpage of the website, and further wherein the event data packet is received during the session of the user with the website;
constructing a short-term re-ranker based upon the event data packet, wherein the short-term re-ranker is assigned to the user;
in response to receiving the data, selecting the short-term re-ranker from amongst a plurality of short-term re-rankers, wherein the short-term re-ranker is selected based upon the identifier of the user;
providing the second ranked list of goods to the short-term re-ranker; and
generating, by the short-term re-ranker, a third ranked list of goods based upon an order of the goods in the second ranked list of goods and the query, wherein the third ranked list of goods is the personalized ranked list of goods.

5. The search computing system of claim 1, wherein the second ranked list of goods is transmitted to the computing system as the personalized ranked list of goods.

6. The search computing system of claim 1, the acts further comprising:
re-ranking the second ranked list of goods to generate a third ranked list of goods, wherein a short-term re-ranker that is specific to a session of the user with the website is employed to re-rank the second ranked list of goods to generate the third ranked list of goods, and further wherein the third ranked list of goods is transmitted to the computing system as the personalized ranked list of goods.

7. The search computing system of claim 1, wherein a good has a cohort assigned thereto in the index, wherein the user of the client computing device is assigned to the cohort, and further wherein the general-purpose ranker generates the first ranked list of goods based upon the cohort being assigned to the good in the index and the user being assigned to the cohort, the good is included in the first ranked list of goods.

8. The search computing system of claim 1, the acts further comprising:
receiving second data from a second computing system that hosts a second web site for a second organization that is offering second goods for acquisition by way of the second website, wherein the second data comprises a second query and a second identifier for a second user of a second client computing device, wherein the second data is transmitted by the second computing system to the search computing system in response to the second computing system receiving the second query from the second client computing device;
in response to receipt of the second data, accessing a second index in the computer-readable storage, wherein the second index is assigned to the second website, the second index includes identifiers of second goods and second features of the second goods offered for acquisition by way of the second website, and further wherein the second index is selected from amongst the several different indexes;
searching the second index based upon the second query to generate a second set of goods, wherein the second set of goods is from amongst the second goods offered for acquisition by way of the second website;
ranking, by the general-purpose ranker, goods in the second set of goods to generate a third ranked list of goods, wherein the general-purpose ranker ranks the goods in the second set of goods based upon the query and the second features;
selecting a second long-term re-ranker from amongst the several different long-term re-rankers, the second long-term re-ranker is selected based upon the second identifier of the second user of the second client computing device;
re-ranking, by the second long-term re-ranker, the goods in the third ranked list of goods to generate a fourth ranked list of goods, wherein the second long-term re-ranker re-ranks the goods in the second set of goods based upon:
an order of the goods in the second set of goods in the third ranked list of goods;
the second query; and
the second features; and
transmitting, from the search computing system, a second personalized ranked list of goods to the second computing system, wherein the second personalized ranked list of goods is based upon the fourth ranked list of goods, and further wherein the second personalized ranked list of goods is transmitted by the second computing system to the second client computing device for presentment to the second user in response to the second computing system receiving the second personalized ranked list of goods from the search computing system.

9. The search computing system of claim 1, wherein the long-term re-ranker is trained based upon event data packets received from the client computing device that loads webpages belonging to the website, wherein the webpages comprise tags that, when executed by a browser of the client computing device, causes the client computing device to transmit the event data packets to the search computing system.

10. The search computing system of claim 9, wherein each event data packet comprises a user identifier that identifies the user and an identity of a webpage of the website that corresponds to an event.

11. A computer-readable storage medium comprising instructions that, when executed by a processor, cause the processor to perform acts comprising:
receiving data from a computing system that hosts a website for an organization that is offering goods for acquisition by way of the website, wherein the data includes an identifier for a user and a query submitted by the user, wherein the data is transmitted by the computing system to the search computing system in response to the computing system receiving the query from a client computing device that is operated by the user;
in response to receipt of the query, selecting an index from computer-readable storage of the search computing system, wherein the index is assigned to the website, the index is selected from amongst several different indexes in the computer-readable storage based upon the data being received from the computing system that hosts the website, wherein the index includes identifiers of goods offered for acquisition by way of the website and features of the goods, and further wherein the several indexes are assigned to different websites;
searching the index based upon the query to generate a set of goods, wherein the set of goods is from amongst the goods offered for acquisition by way of the website;
ranking, by a general-purpose ranker, goods in the set of goods to generate a first ranked list of goods, wherein the general-purpose ranker ranks the goods in the set of goods based upon the query and the features of the goods in the set of goods, and further wherein the general-purpose ranker is employed to generated ranked lists of goods for the different websites regardless of which of the several indexes of the different websites is searched, and further wherein the different websites are operated by different organizations;
selecting a long-term re-ranker from amongst several long-term re-rankers based upon the identifier for the user of the client computing device;
re-ranking, by the long-term re-ranker, the goods in the first ranked lists of goods to generate a second ranked list of goods, wherein the long-term re-ranker re-ranks the goods in the first ranked list of goods based upon:
an order of the goods in the first ranked list of goods;
the query;
the features of the goods in the index; and
information that is indicative of features of goods that have been historically of interest to the user; and
transmitting a personalized ranked list of goods to the computing system, wherein the personalized ranked list of goods is based upon the second ranked list of goods, and further wherein the personalized ranked list of goods is transmitted by the computing system to the client computing device for presentment to the user in a webpage of the website in response to the computing system receiving the personalized ranked list of goods from the search computing system.

12. The computer-readable storage medium of claim 11, the acts further comprising:
prior to receiving the data, receiving an event data packet from the client computing device, wherein the event data packet represents an interaction of the user with a webpage of the web site; and
prior to receiving the data, training the long-term re-ranker based upon the event data packet.

13. The computer-readable storage medium of claim 12, wherein the data is received during a session of the user with the website, wherein the event data packet is received during a previous session of the user with the website, and further wherein the long-term re-ranker is trained subsequent the previous session and prior to the session.

14. A method performed by a search computing system, the method comprising:
receiving data from a computing system that hosts a website for an organization that is offering goods for acquisition by way of the website, wherein the data includes an identifier for a user and a query submitted by the user to the computing system, wherein the data is transmitted by the computing system to the search computing system in response to the computing system receiving the query from a client computing device that is operated by the user, and further wherein the search computing system and the computing system are operated by different entities;
in response to receipt of the query, selecting an index stored in computer-readable storage of the search computing system, where the index is assigned to the website, the index includes identifiers of goods offered for acquisition by way of the website and features of the goods, and further wherein the index is selected from amongst several different indexes that are assigned to respective websites that are operated by different organizations;
searching the index based upon the query to generate a set of goods, wherein the set of goods is from amongst the goods offered for acquisition by way of the website;
ranking, by a general-purpose ranker, goods in the set of goods to generate a first ranked list of goods, wherein the general-purpose ranker ranks the goods in the set of goods based upon the query and the features of the goods in the set of goods, and further wherein the general-purpose ranker is employed to generate ranked lists of goods for the respective websites regardless of which of the indexes of the respective websites is searched;
selecting a long-term re-ranker from amongst several different long-term re-rankers, the long-term re-ranker selected based upon the identifier for the user of the client computing device;
re-ranking, by the long-term re-ranker, the goods in the first ranked lists of goods to generate a second ranked list of goods, wherein the long-term re-ranker re-ranks the goods in the first ranked list of goods based upon:
an order of the goods in the first ranked list of goods;
the query;
the features of the goods in the index; and
information that is indicative of features of goods that have been historically of interest to the user;
transmitting a personalized ranked list of goods from the search computing system to the computing system, wherein the personalized ranked list of goods is based upon the second ranked list of goods, and further wherein the personalized ranked list of goods is transmitted by the computing system to the client computing device for presentment to the user in a webpage of the website response to the computing system receiving the personalized ranked list of goods from the search computing system.

15. The method of claim 14, the acts further comprising:
prior to receiving the data, receiving an event data packet from the client computing device, wherein the event data packet represents an interaction of the user with a webpage of the website; and
prior to receiving the data, training the long-term re-ranker based upon the event data packet.

16. The method of claim 15, wherein the data is received during a session of the user with the website, wherein the event data packet is received during a previous session of the user with the website, and further wherein the long-term re-ranker is trained subsequent the previous session and prior to the session.

17. The method of claim 14, wherein the data is received during a session of the user with the website, the method further comprising:
prior to receiving the data, receiving an event data packet from the client computing device, wherein the event data packet represents an interaction of the user with a webpage of the website, and further wherein the event data packet is received during the session of the user with the web site;
constructing a short-term re-ranker based upon the event data packet, wherein the short-term re-ranker is assigned to the user;
in response to receiving the data, selecting the short-term re-ranker from amongst a plurality of short-term re-rankers, wherein the short-term re-ranker is selected based upon the identifier of the user;
providing the second ranked list of goods to the short-term re-ranker; and
generating, by the short-term re-ranker, a third ranked list of goods based upon an order of the goods in the second ranked list of goods and the query, wherein the third ranked list of goods is the personalized ranked list of goods.

18. The method of claim 14, wherein the second ranked list of goods is transmitted to the computing system as the personalized ranked list of goods.

19. The method of claim 14, further comprising:
re-ranking the second ranked list of goods to generate a third ranked list of goods, wherein a short-term re-ranker that is specific to a session of the user with the website is employed to re-rank the second ranked list of goods to generate the third ranked list of goods, and further wherein the third ranked list of goods is transmitted to the computing system as the personalized ranked list of goods.

20. The method of claim 14, wherein a good has a cohort assigned thereto in the index, wherein the user of the client computing device is assigned to the cohort, and further wherein the general-purpose ranker generates the first ranked list of goods based upon the cohort being assigned to the good in the index and the user being assigned to the cohort, the good is included in the first ranked list of goods.

* * * * *